Dec. 14, 1954    J. B. OWENS ET AL    2,697,153
CIRCUIT INTERRUPTER

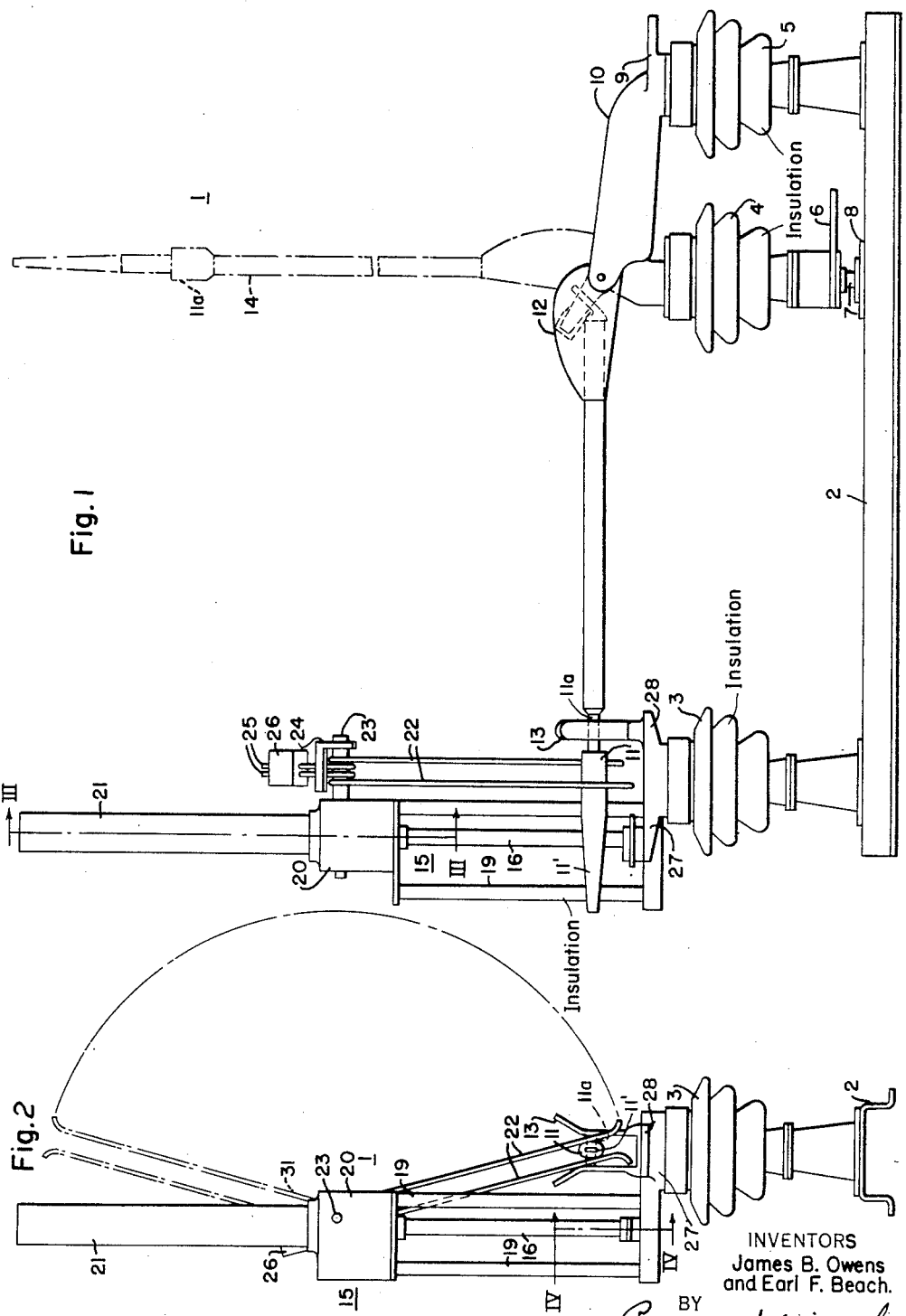

Filed Nov. 13, 1950    4 Sheets-Sheet 2

INVENTORS
James B. Owens
and Earl F. Beach.
BY
Ralph H. Swingle
ATTORNEY

Dec. 14, 1954  J. B. OWENS ET AL  2,697,153
CIRCUIT INTERRUPTER
Filed Nov. 13, 1950  4 Sheets-Sheet 3

WITNESSES:

INVENTORS
James B. Owens
and Earl F. Beach.
BY
Ralph H. Swingle
ATTORNEY

Dec. 14, 1954    J. B. OWENS ET AL    2,697,153
CIRCUIT INTERRUPTER

Filed Nov. 13, 1950    4 Sheets-Sheet 4

At Rest
Zero Energy

Closed
Position

Factory
Setting

Prebiasing
For Opening

Prebiasing
For Opening

Released and
Open Position

Prebiasing
For Closing

WITNESSES:
H. F. Susser
W. R. Crout

INVENTORS
James B. Owens
and Earl F. Beach.
BY
Ralph H. Swingle
ATTORNEY

United States Patent Office 2,697,153
Patented Dec. 14, 1954

2,697,153

CIRCUIT INTERRUPTER

James B. Owens, East McKeesport, and Earl F. Beach, Pittsburgh, Pa., assignors to Westinghouse Electric Corporation, East Pittsburgh, Pa., a corporation of Pennsylvania Application November 13, 1950, Serial No. 195,294

16 Claims. (Cl. 200—146)

This invention relates to circuit interrupters in general, and, more particularly, to load-break disconnecting switches.

At the present time, outdoor disconnecting switches equipped with arcing horns are sometimes used to interrupt small currents, such as transformer magnetizing currents and line charging currents. These switches have a substantial interrupting ability under favorable conditions; however, if a wind is blowing when the interruption is attempted, there is a considerable danger of the arcs being blown across phases to create a line-to-line fault. The only available device for such interruption which is completely dependable is a high-voltage circuit breaker. The high cost of such circuit breakers has led to the considerable use of air-break switches in spite of the hazard involved. There long has been a need for a low-cost device with ample capacity to interrupt magnetizing and charging currents, and with more dependable operation than an air-break switch. There have been designed low-cost circuit breakers, usually built in conjunction with disconnecting switches, to fill the need. These devices, however, are essentially circuit breakers with fault current interrupting ability. Having this ability, the devices are necessarily complex and costly. The need is still great for a simple and inexpensive high voltage interrupter for load currents only. Such a device is preferably in the form of an addition to existing disconnecting switches to increase their interrupting ability and dependability.

There are three requirements for operation of a load interrupter switch which have been obstacles to the development of such a device:

(1) The contacts must part at high speed to prevent restriking, particularly when interrupting line charging current. This speed must be independent of the speed of operation of the manual operating handle.

(2) The addition of the interrupter must not unduly increase the operating effort of the disconnecting switch.

(3) The device must operate dependably when covered with snow and ice.

It is a general object of our invention to provide an improved load-break disconnecting switch, which will incorporate several novel features to enable it to overcome the obstacles imposed by the requirements given above.

Another object is to provide an improved circuit interrupter, particularly one of the load-break disconnecting switch type, in which the energy necessary to operate the interrupting contacts may be stored within the switch itself so that a minimum of external effort is required only to overcome the losses due to friction.

Another object is to provide an improved load-break disconnecting switch having high speed interrupting contacts and which may also be readily incorporated into existing standard disconnecting switches.

A further object is to provide an improved operating mechanism for a load-break disconnecting switch, the operation of which may be readily effected with a minimum of additional external effort by the usual operating mechanism for the disconnecting switch proper.

Another object is to provide an improved load-break disconnecting switch in which the energy required to operate the switch will be at a minimum, and what little energy is required may be progressively furnished by a relatively constant force exerted over a considerable length of travel of the disconnecting switch blade.

Further objects and advantages will readily become apparent upon reading the following specification, taken in conjunction with the drawings, in which:

Fig. 1 is a side elevational view of a load-break disconnecting switch incorporating our invention, and shown in the closed-circuit position;

Fig. 2 is an end elevational view of the load-break disconnecting switch illustrated in Fig. 1, the contact structure also being shown in the closed-circuit position;

Figure 8:
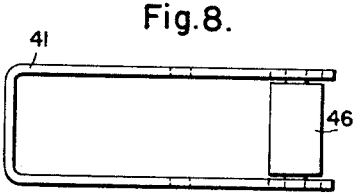
Figure 9:
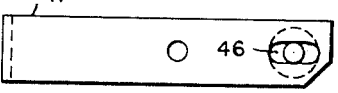
Figure 10:
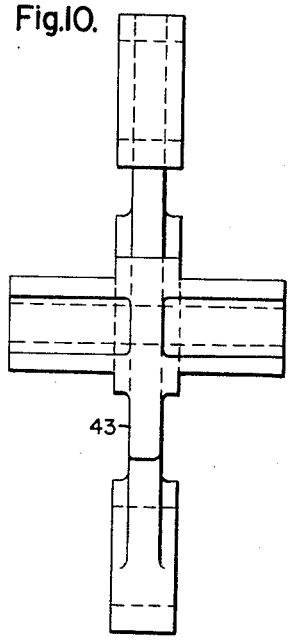
Figure 11:
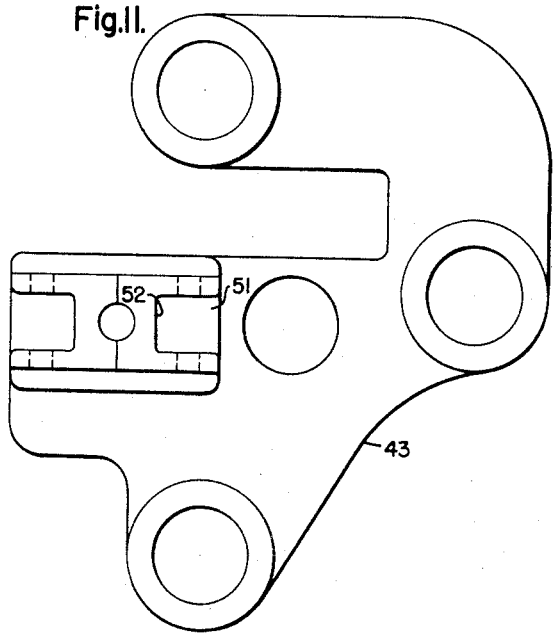

Figs. 8 and 9 collectively illustrate the form of latches utilized in our improved operating mechanism;

Figs. 10 and 11 collectively illustrate the configuration of the latch supporting casting utilized in our improved mechanism; and Figs. 12–16 diagrammatically illustrate the principles involved in our improved mechanism.

Referring to the drawings, and more particularly to Figs. 1 and 2 thereof, it will be noted that we illustrate a circuit interrupter 1, specifically of the load-break disconnecting switch type, mounted upon a frame support 2, which, as more clearly shown in Fig. 2, is of channel configuration. Extending upwardly from the frame support 2 are a plurality of insulator stacks 3, 4, 5 formed of a suitable insulating material, such as porcelain, having required mechanical strength, and preferably provided with one or more petticoats to increase the surface breakdown path. The height of the insulator stacks 3, 4 and 5 depends upon the voltage encountered. The end insulator stacks 3, 5 are stationary, whereas the middle insulator stack 4 is rotatable, having a crank-arm 6 secured thereto adjacent its lower end. The insulator stack 4 is rotatably mounted upon a vertical shaft 7 provided with a suitable bearing 8 secured in the frame support 2.

The end insulator stack 5 supports a conducting member or a line terminal connection 9 for the interrupter, and also a housing 10 enclosing a suitable mechanism for rotating the disconnect switch blade 11 vertically. The mechanism enclosed within the housing 10 and operated by rotation of the crank arm 6 forms per se no part of our invention, and therefore is not specifically illustrated. Reference may be had to United States Patent No. 2,363,360, issued November 21, 1944 to Herbert L. Rawlins, and assigned to the assignee of the instant application for a complete description of the mechanism enclosed within the housing 10 and also the housing 12. As mentioned, the rotation of insulator stack 4 by the crank-arm 6 effects functioning of the mechanism within the housings 10, 12 to thereby effect upward swinging disconnecting motion of the switch blade 11 out of electrical engagement with the jaw contacts 13 to a position indicated by the dot-dash lines 14 of Fig. 1. Thus, the dot-dash lines 14 indicate the fully open circuit position of the interrupter 1.

The end insulator stack 3 not only supports the main jaw contacts 13, but also supports an interrupting device, generally designated by the reference numeral 15, and normally shunted out of the circuit in the closed-circuit position of the interrupter, as shown in Figs. 1 and 2.

Figure 4:
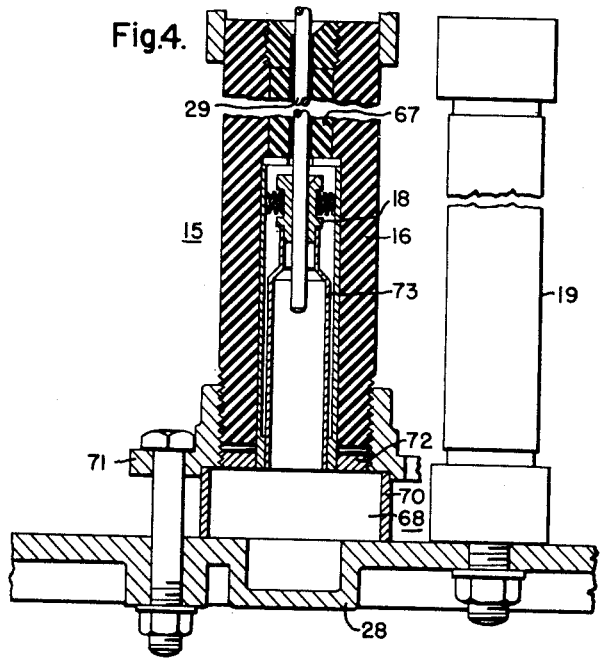
Fig. 4 is an enlarged fragmentary substantially vertical sectional view taken through the lower half of the interrupting portion of our improved load-break disconnecting switch along the line IV—IV of Fig. 2, the contact structure being also shown in the closed-circuit position.

The interrupting device 15 includes an elongated interrupter tube 16, interiorly of which, as is more clearly shown in Fig. 4, is a stationary contact 18.

About the interrupting tube 16 are disposed a plurality, in this instance three, insulating supporting rods 19, which serve to support a mechanism housing 20 and a spring housing 21.

Figure 5:
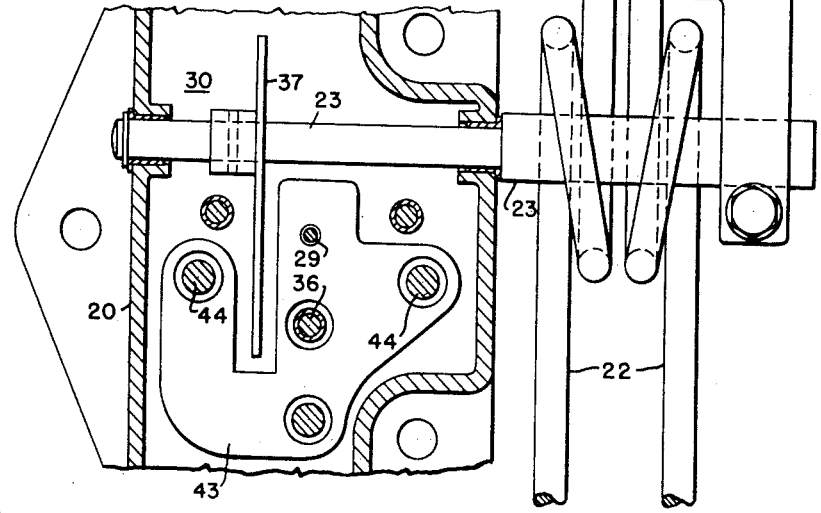
Fig. 5 is an enlarged fragmentary sectional view taken substantially along the line V—V of Fig. 3, illustrating a further portion of the operating mechanism.

A pair of resilient wire-like contact arms 22 are rotatably mounted about a shaft 23 journalled within the mechanism housing 20, and having a bracket 24 secured to the external end thereof, as is more clearly shown in Figs. 1 and 5.

The wire contact arms 22 preferably encircle the shaft 23, and have their ends 25 clamped to the bracket 24. A counterweight 26 is secured to the extremity of the contact arms 22, the purpose for which will be explained more fully hereinafter.

The insulator stack 3 also carries a second spaced conducting member or line terminal 27 for the interrupter 1, so that in the closed circuit position of the interrupter, as shown in Fig. 1, the circuit includes line terminal 27, support casting 28, jaw contacts 13, conducting switch blade 11, through conducting housings 12 and 10 to the other line terminal 9 of the interrupter.

Briefly, the overall operation of the load-break disconnecting switch 1 is such that rotation of insulator stack 4 by actuation of crank arm 6 effects through the mechanism enclosed within housings 10, 12 first a substantially 90° axial rotation of the switch blade 11 to release the high contact pressure and free any ice between the contacts 11, 13 and then an upward swinging disconnecting motion of the switch blade 11, to cause the separation therefrom from the stationary jaw contacts 13. At the moment of separation between the jaw contacts 13 and the switch blade 11, the electrical circuit passes from the line terminal 27 to the stationary contact 18 by way of the conducting casting 28, thence through a movable contact rod 29 to the conducting housing 20, through the conducting shaft 23 to bracket 24 and thence through the flexible contact arms 22 to the switch blade 11.

Accordingly, following separation of the contacts 11, 13, the circuit then extends serially through the interrupting device 15. Further upward swinging motion of the disconnect switch blade 11, as caused by further rotation of crank arm 6, effects through the contact arms 22 counterclockwise rotation of the shaft 23 (as viewed in Fig. 2). Meanwhile the switch blade 11 remains in sliding electrical contact between the two contact arms 22, so that not only do the contact arms 22 serve to carry the current from switch blade 11, but also they effect, as previously described, counterclockwise rotative motion of the shaft 23. It will be observed that during this rotation of the contact arms 22 about shaft 23 due to upward swinging motion of the disconnect switch blade 11 that the counterweight 26 assists such movement by balancing the rotative parts.

The rotation of the contact arms 22 about axis 23 by the switch blade 11 effects separation of the contacts 18, 29 by an actuation of the mechanism 30 enclosed in the housing 20, to effect thereby interruption of the arc drawn between the contacts 18, 29 within the interrupting tube 16 and hence circuit interruption. However, the switch blade 11 does not separate from the contact arms 22 until after interruption of the arc has occurred within the interrupting tube 16, and the circuit consequently has been broken through the interrupter 1. It is only after the circuit has been interrupted by operation of the interrupting device 15 that the switch blade 11 finally separates from the contact arms 22, and swings to its full open-circuit position, as shown by the dot-dash lines 14 of Fig. 1. It is to be noted that in the full open-circuit position of the switch blade 11, as shown by the dot-dash lines 14 of Fig. 1, that the contact arms 22 likewise remain stationary in their upper position, as indicated by the dot-dash lines 31 of Fig. 1.

During the closing operation, rotation of the crank arm 6 associated with insulator stack 4 effects functioning of the mechanism housed within housings 10, 12 to effect thereby counterclockwise rotative closing motion of the switch blade 11, as viewed in Fig. 1. During this closing motion of switch blade 11, it finally engages the contact arms 22 in their upper open-circuit position, as indicated by the dot-dash lines 31 of Fig. 1. Thus the switch blade 11 enters between the contact arms 22 and forcibly effects clockwise rotation of the contact arms 22 about the shaft 23, thereby effecting through operation of the mechanism 30 of Fig. 3 closing of the contact structure within the interrupting device 15. Near the end of the closing stroke of the switch blade 11, it finally enters between the stationary switch jaws 13. It then twists substantially 90° axially to force the widened portion 11a between the jaw contacts 13, spreading them apart to exert high contact pressure. This engaging of the switch blade 11 with the jaw contacts 13 shunts out of the circuit the interrupting device 15. The interrupter 1 is hence returned to its closed position, as indicated in Fig. 1.

Figure 3:
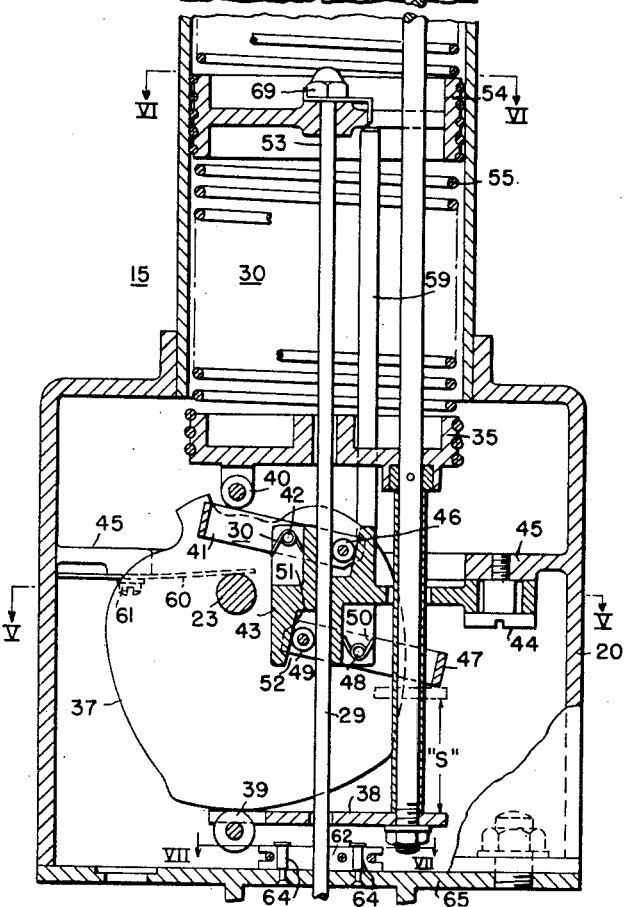
Fig. 3 is a substantially vertical sectional view taken through the top half of the interrupting portion of our improved load-break disconnecting switch along the line III—III of Fig. 1, illustrating the complete mechanism therefor, and the contact structure being shown in the closed-circuit position.
Figure 6:
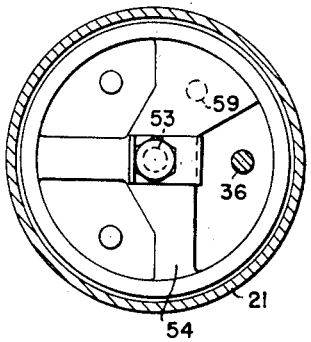
Fig. 6 is a view in section taken along the line VI—VI of Fig. 3.

Referring to Figs. 3 and 4, which collectively illustrate the interrupting device 15, it will be observed that the spring housing 21 encloses a spring cage 33, which includes a pair of spider spring retainers 34, 35 rigidly interconnected by a plurality of, in this instance three, metallic tie rods 36. The spring cage 33 is movable, as more fully described hereinafter, by a cam plate 37 rigidly affixed to the rotatable shaft 23 and actuated thereby. The tie rods 36 not only rigidly interconnect the spring retainers 34, 35 a fixed distance apart, but also they are extended to support a cam follower plate 38 with the spring cage 33 so as to be movable therewith. A cam follower 39 is pivotally mounted on the cam follower plate 38 and follows the cam plate 37.

A second cam follower 40 is pivotally mounted upon the lower spring retainer 35, and not only follows the cam plate 37, but also, in its lower position, engages closing latch 41, the latter being pivotally supported, as at 42, to a latch support casting 43, more fully shown in Figs. 3, 10 and 11, and mounted by screws 44 to a radially inwardly extending flange portion 45 of the mechanism housing 20.

A latch roller 46 is pivotally mounted within the U-shaped latch 41, as shown more clearly in Figs. 8 and 9, and bears against the side of the movable contact rod 29. A second latch, which may be termed an opening latch 47, is likewise of U-shaped configuration, and is pivotally mounted, as at 48, to the latch support casting 43. The opening latch 47 likewise has a roller 49 pivotally mounted thereon, which bears against the opposite side of the movable contact rod 29. Both the closing latch 41 and the opening latch 47 are spring-biased about their supporting pins 42, 48, respectively, by helical springs 50 encircling the mounting pins 42, 48 and biasing the latch rollers 46, 49 toward the center of the latch support casting 43.

At this point, it is to be noted that both the closing latch 41 and the opening latch 47 are unidirectional latches. That is, the closing latch 41 will prevent downward closing movement of the contact rod 29, but will freely permit, without opposition, upward opening movement of the contact rod 29. Similarly, the opening latch 47 will prevent opening upward movement of the contact rod 29, but will freely permit downward closing movement of the contact rod 29. This, of course, occurs by virtue of the wedging action of the latch rollers 46, 49 between the sides of the contact rod 29 and the slanting sides 51 provided in recesses 52 formed in the latch support casting 43.

The upper end 53 of the contact rod 29 has affixed thereto a movable spring spider 54, which supports the upper end of the opening spring 55 and the lower end of the closing spring 56. Although two separate springs 55, 56 are actually utilized, theoretically only a single spring is required, the only requirement being the necessity of attaching the spring spider 54 halfway between the ends of such a single spring. However, if a single spring were used, it would necessitate threading the spring spider 54 through the spring halfway between the ends thereof; and since this is cumbersome, it is more desirable for facilitating manufacture of the spring cage 33 to utilize, instead of a single spring, a pair of springs, herein termed an opening spring 55 and a closing spring 56. As mentioned, each of these springs 55, 56 has one of its ends rigidly secured to the movable spring spider 54 so that the spring spider 54 may oscillate freely within the movable spring cage 33.

A pair of stops are preferably provided to limit the amount of travel of the movable contact rod 29. Thus, an upper contact stop 57 is provided in the form of a rod threaded at its upper end to the cap 58 of the spring housing 21. This stop 57 serves to halt the upward motion of the movable spring spider 54 and the movable contact rod 29 at the end of the opening operation. Likewise, a stop 59, in the form of a rod, is brazed to the flange portion 45, and extends through the lower spider spring retainer 35 to strike the movable spring spider 54 at the lower limit of closing motion of the contact rod 29.

Figure 7:
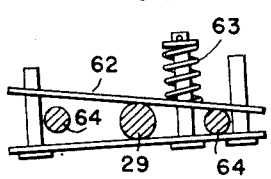
Fig. 7 is an enlarged view in section taken along the line VII—VII of Fig. 3, looking in the direction of the arrows.

To provide a current path between the mechanism housing 20 and the rotatable shaft 23, we provide a flexible leaf contact 60 secured by a screw 61 to the flange 45 of the mechanism housing 20. Also, to provide a good current path between the mechanism housing 20 and the movable contact rod 29, we provide a pair of plate contacts 62 biased together by a spring 63 in a manner more clearly shown in Fig. 7. The plate contact 62 is limited in vertical motion by the use of a pair of screws 64 which are secured to the bottom 65 of the mechanism housing 20.

The operation of the mechanism 30 will now be described. Upward swinging motion of the switch blade 11 effects through the contact arms 22 counterclockwise rotative motion of the shaft 23, as viewed in Figs. 2 and 3. The cam plate 37, rigidly affixed to the shaft 23, rotates therewith and effects through the cam follower 40 upward prebiasing of the spring cage 33 to the position indicated by the dot-dash lines 66 of Fig. 3. Meanwhile the movable contact rod 29 and movable spring spider 54 remain fixed, being latched by the opening latch 47. Since the cam follower plate 38 moves upwardly with the spring cage 33, it results that when the spring cage 33 is at the position 66 the cam follower plate 38 will strike the opening latch 47, releasing the same, and permitting free upward opening motion of the movable contact rod 29 away from the stationary contact 18 and drawing an arc within the gas-evolving tube 67. This tube may be of fiber or boric acid or other suitable gas-evolving material, and the gas evolved thereby as a result of contact with the arc will blow downwardly through the arc stream, through the tubular stationary contact 18, to exhaust out the vent 68 associated with the support casting 28. The de-ionizing action of the gas blast causes the arc to be extinguished, and the movable contact rod 29 rapidly moves to its fully open circuit position, as indicated by the dot-dash line 69 of Fig. 3, where the movable spring spider 54 strikes and is stopped by the opening stop 57.

It will be observed that the movable spring spider 54 moved upwardly not only by virtue of the energy stored within the compressed opening spring 55, but also by virtue of the potential energy stored in the closing spring 56 which was under tension at the beginning of the opening operation. The prebiasing or presetting of the spring cage 33 by the camming action of cam plate 37 against cam follower 40 and hence the spring cage 33 restores the energy losses due to friction during the operation of the mechanism 30, as more fully explained hereinafter.

When the movable contact rod 29 has reached the extreme upper limit of its travel, that is, when movable spring spider 54 has struck and is stopped by the opening stop 57, the closing latch 41 will immediately hold the movable contact 29 in this fully open position. Without the presence of the closing latch 41, the movable spring spider 54 would have bounced downwardly away from the stop 57, and the system would have oscillated until the friction would have dissipated the stored energy. With our invention, the kinetic energy involved in the opening operation of the contact rod 29 and movable spring spider 54 is absorbed at the end of the opening operation by compression of the closing spring 56 and extension of the opening spring 55, and this potential energy is retained by operation of the closing latch 41.

Meanwhile the switching blade 11 has separated from the upper ends of the contact arms 22 and moves to its full open-circuit position, as indicated by the dot-dash lines 14 of Fig. 1. The interrupter is now in the full open-circuit position.

The closing operation of the load-break disconnect switch, will now be described. During the closing operation, the switch blade 11 enters between the upstretched contact arms 22 (which are now in the position 31 of Fig. 2) and forces them downwardly to thereby effect rotation of the shaft 23 and cam plate 37. The rotation of the cam plate 37 by the shaft 23 prebiases or presets the spring cage 33 by forcing the cam follower 39 and cam follower plate 38 downwardly. Since the cam follower plate 38 is rigidly attached to the spring cage 33, the net result is a further compression of the closing spring 56 and a further extension of the opening spring 55. After a predetermined pretensioning of the closing spring 56 and a further pretensioning of the opening spring 55, the cam follower 40 will strike the closing latch 41 to cause thereby release of the movable contact rod 29 and the movable spring spider 54.

The spring spider 54 and the movable contact rod 29 will then rapidly move to the closed circuit position, in which the contact rod 29 makes engagement with the stationary contact 18, in overlapping manner, as shown in Fig. 4. The movable spring spider 54 strikes and is stopped by the stop post 59. Meanwhile, the switch blade 11 has moved the contact arms 22 around in a clockwise manner, as viewed in Fig. 2, until the switch blade 11 nears the stationary jaw contacts 13. However, before the switch blade 11 actually contacts the stationary jaw contacts 13, the circuit will already have been closed through the interrupting device 15. In other words, movable contact 29 will have engaged stationary contact 18 before switch blade 11 engages stationary jaw contacts 13. It will be, of course, observed that once the switch blade 11 has entered between the stationary jaw contacts 13, the interrupting device 15 will have been shunted out of the circuit.

To trace the electrical circuit through the entire interrupting device, the following description will be given. In the closed position, as indicated by the full lines in Figs. 1–5, the circuit includes line terminal 27, jaw contacts 13, switch blade 11 and through the housings 12, 10 to the other line terminal 9. During the opening operation, after switch blade 11 has parted contact with stationary jaw contacts 13, the circuit extends specifically from line terminal 27, support casting 28, tube 70 (Fig. 4), conducting flange 71, perforated end plate 72, stationary contact tube 73, stationary contact 18, movable rod contact 29, plate contact 62 (Fig. 7), screws 64 to bottom end plate 65. The circuit then extends through the mechanism housing casting 20, through conducting flange support 45 to flexible leaf contact 60. The circuit then extends through conducting shaft 23 to bracket 24, and thence through the two contact arms 22 to the switch blade 11. The circuit then extends through the conducting housings 12, 10 to the right-hand line terminal 9 of Fig. 1.

Referring specifically to Figs. 12 through 16, which illustrates the theoretical principles involved in the operation of our mechanism 30, it will be observed that we have diagrammatically indicated the spring cage 33, spider spring retainers 34, 35 spaced apart by tie rods 36. The movable contact rod 29 is diagrammatically shown connected to the movable spring spider 54 which is attached to one end of each of the springs 55, 56.

Figure 12:
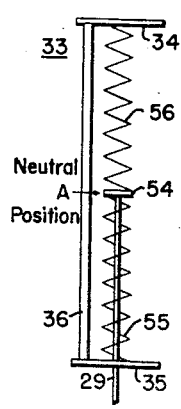

Considering only Fig. 12, and assuming the spring cage 33 to be fixed in position at all times, it will, of course, be apparent that the movable spring spider 54 will come to, and remain at, a neutral position, as indicated in Fig. 12. Now, if the contact rod 29 and the movable spring spider 54 are forcibly moved axially to a position so as to compress one of the springs and place the other spring in tension, and then the movable contact rod 29 be released, the movable contact rod 29 and the movable spring spider 54 will oscillate back and forth vertically about the mean neutral position A, until energy losses through friction will force the movable spring spider to arrive at and remain at the neutral position A.

Figure 13:
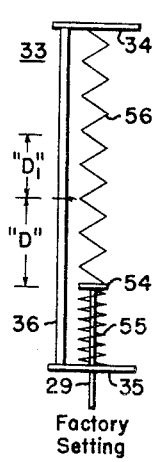

Now assume the movable contact rod 29 and the movable spring spider 54 are moved downwardly to compress the opening spring 55 and to place in tension the closing spring 56, as shown in Fig. 13. Assume further that the rod 29 is released. The result will be that the movable contact rod 29 and the movable spring spider 54, which have been, say, pretensioned a distance D, will fly upwardly, but will not move as far upwardly as it was pretensioned downwardly. In other words, the upward distance $D_1$ to which the spring spider 54 will reach in an upward direction will be less than the distance D, to which the spring spider 54 was moved in a downward direction. $D_1$ is less than D due to the losses of energy resulting from friction. Consequently, without any pretensioning or prepositioning of the spring cage 33, the energy which was stored up by movement of the movable contact rod 29 to the position D will ultimately be lost since each time the movable contact rod 29 moves, it will arrive at a point a less distance away from the neutral position A than it was in the immediately preceding position. Thus, to make the device remain effectively in operation, it is necessary to add a slight amount of energy to the system during each operation to replace the energy losses taking place during such an operation through friction losses.

Figure 14:
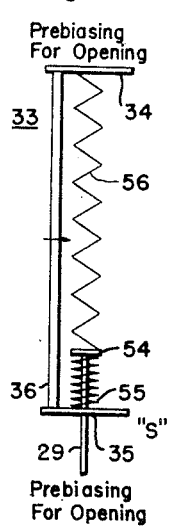

We add energy to the system during each operation by actually moving the spring cage 33, and thereby precompressing one of the springs and pretensioning the other of the springs. During the opening operation, the spring cage 33 is prepositioned an upward amount S, as indicated in Fig. 14. By this addition of energy, it is ensured that the spring spider 54 will always reach its opposing stop 57, 59. When it does reach its opposing stop 57, 59, it is immediately latched in this position awaiting the next operation.

Figure 16:
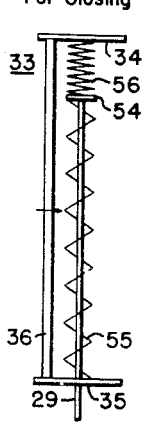

During the closing operation, the spring cage 33 is prepositioned a distance S in the downward direction, as shown in Fig. 16, so that in such a position the closing spring 56 is precompressed and the opening spring 55 is pretensioned. Upon a subsequent unlatching of the spring spider 54, the spring spider 54 will always reach the closing stop 59, in which position it is latched by the opening latch 47.

The circuit interrupter 1, as manufactured, is given an initial amount of energy, as represented in Fig. 13. In other words, when the interrupter 1 is shipped to a customer, it actually contains the amount of potential energy as indicated in Fig. 13. Thus, the movable spring spider 54 has been moved a distance D downwardly, as represented in Fig. 13, before being shipped to the customer. The interrupter is, consequently, shipped in the closed position as represented by the full lines in Figs. 1 and 2.

When the customer desired to open the interrupter, the spring cage 33 is moved an upward distance S, as indicated in Fig. 14, by the camming action of the cam plate 37, as previously described, by the counterclockwise rotation of the arms 22 and shaft 23 during the opening operation of the switch blade 11.

Figure 15:
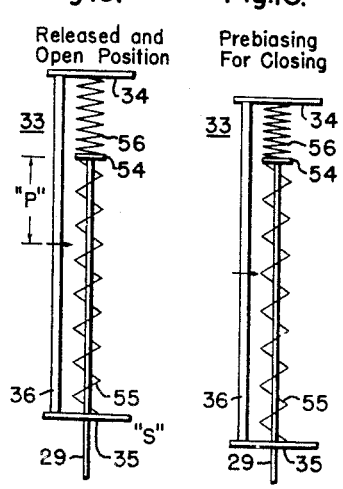

Upon release of the opening latch 47, the spring spider 54 will fly upwardly to the distance P represented in Fig. 15, in which position the spring spider 54 has struck, been stopped by the stop post 57 and has been latched by the closing latch 41 in this position. Fig. 15, therefore, represents the full open-circuit position of the movable contact rod 29 when the interrupter 1 is in the full open-circuit position, as indicated by the dot-dash lines 14 of Fig. 1. Also, it will be noted that the position of Fig. 15 is that of the dot-dash position 69 of Fig. 3.

During the closing operation, closing swinging movement of the switch blade 11, causing clockwise rotation of the contact arms 22 and of shaft 23 (as viewed in Fig. 2) causes prepositioning of the spring cage 33 a distance S, as indicated in Fig. 16. This prepositioning of the spring cage 33 by the closing camming action of the cam plate 37 thus adds additional energy to the system so that when the closing latch 41 is tripped by the cam follower 40 to effect thereby release of the movable rod contact 29, the latter flies downwardly to the completely closed position, as indicated in Fig. 13. In this position, the movable contact rod 29 is latched, as indicated by the full lines of Fig. 3.

Thus, fundamentally during each opening and closing operation of the interrupting device 15, a small amount of additional energy is added to the system by the prepositioning of the spring cage 33 a distance S before unlatching of the movable contact rod 29. This additional amount of energy which is added at the beginning of each opening or closing operation ensures that once the movable contact rod 29 is released, it will always attain the position defined by one of its two limiting stops 57, 59.

From the foregoing, it will be observed that the arc formed during interruption is entirely confined to the interrupting tube 67. The disconnect blade 11 disengages from the contact arms 22 and thus removes the voltage from across the open interrupting contacts 18, 29.

The use of an interrupter which is normally by-passed by the main switch, and whose contacts carry current only while the switch is being operated makes possible the use of small and lightweight moving contacts. This gives the necessary high contact velocity with much smaller springs than would be required if the contacts were designed to carry current continuously, and thus this shunted interrupter has a considerably lower cost than a series interrupter. However, any interrupter which derives its driving power at the end of a long switch blade 11 tends to greatly increase the operating effort of the switch mechanism. The effort thus required to operate the interrupter acts on the long blade 11 as a lever and reflects a high torque into the switch operating mechanism. It will be noted that we have minimized the effort required by the novel actuating mechanism 30 for the moving contact 29 within the interrupting tube 16.

The contact actuating means 30 in our circuit interrupter 1 requires a very small operating effort because it is an energy saving mechanism. The mechanism is assembled with the contacts closed, and the energy required to accelerate the contacts to the open position is stored in the springs 55, 56. When the opening latch 47 is released, the energy stored during assembly appears as kinetic energy in the motion of the movable contact 29. When the movable contact 29 nears the open position, it is decelerated by compression of a second spring 56 and extension of opening spring 55, and its kinetic energy stored in these springs is used in closing the switch. With this arrangement, the only energy which must be added to the system to close the switch is the energy lost in friction in the opening operation. The closing operation is similar to the opening operation, and the kinetic energy of the moving contact 29 caught and saved for opening the switch.

From the foregoing, it will be seen that we have invented an interrupting unit for addition to a standard disconnecting switch which has the advantage of being normally shunted by the disconnecting switch, and which has ease of operation because of its energy saving features. The energy required to move the contacts is stored in the device during assembly, and only the friction operating losses are supplied during normal operation. The operating effort is further reduced by the use of a counterbalance weight 26, as shown more clearly in Figs. 1 and 5. The weight 26 offsets the weight of the operating arms 22.

To enable normal operation of this device when covered with ice, a special ice-breaking mechanism has been incorporated. This mechanism can be understood by referring again to the operating arms 22. It can be seen that the operating arms 22 which engage the blade extension 11' are made flexible by winding them into a torsion spring around the shaft 23 to which they are attached. The blade extension 11' which engages the arms 22 has an elliptical or non-circular section, as more clearly shown in Fig. 2; and during the initial portion of the opening operation, as previously explained, the blade 11 is rotated about its own axis by the mechanism contained within the housings 10, 12.

The elliptical blade extension 11' is so mounted that it forces the two operating arms 22 apart during such rotation. This relative motion of the arms 22 serves to break any ice which has bridged the arms or formed between the arms and other switch parts. It will be noted that the action described causes any ice bridging the operating arms 22 to be loaded in tension in which direction it is most easily broken. The blade twisting motion used is inherent in most conventional disconnecting switches by the usual mechanism contained within the housings 10, 12. For a complete description of such mechanism, which per se forms no part of our invention, refer to the abovementioned patent by Herbert L. Rawlins. Such motion is used to twist the main contacts out of engagement before the switch blade 11 begins to rise; thus no modification in the standard design is necessary by an incorporation of our interrupting device 15.

In summary, we have invented a load-break interrupting disconnect switch for addition to outdoor disconnecting switches of the vertical break type involving a rotating insulator. The interrupter has new and novel means for transferring current to a path through the interrupter during an interrupting operation, for saving the kinetic energy of the moving contacts to reduce operating effort, and for breaking ice accumulations which might otherwise interfere with proper operation.

Although we have shown and described a specific structure, it is to be clearly understood that the same was merely for the purpose of description, and that changes and modifications may readily be made therein

We claim as our invention:

1. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, the other of the arc establishing contacts being connected to one end of each of said opening and closing springs intermediate the ends of the spring cage, and means for causing the initial opening motion of the blade means to slightly move the spring cage to pretension the springs more than they were tensioned in the closed circuit position of the interrupter.

2. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, the other of the arc establishing contacts being connected to one end of each of said opening and closing springs intermediate the ends of the spring cage, latching means for latching the other of the arc establishing contacts in either the closed or open positions to thereby tension the springs, and means for causing the initial opening motion of the blade means to slightly move the spring cage to pretension the springs more than they were tensioned in the closed-circuit position of the interrupter.

3. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, the other of the arc establishing contacts being connected to one end of each of said opening and closing springs intermediate the ends of the spring cage, cam means for pretensioning the spring cage, at least one operating arm for rotating the cam means, and the blade means causing the operating arm to rotate the cam means during the initial portion of the opening operation.

4. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, the other of the arc establishing contacts being connected to one end of each of said opening and closing springs intermediate the ends of the spring cage, cam means for pretensioning the spring cage, a pair of resilient spaced operating arms for rotating the cam means, and the blade means causing the operating arms to rotate the cam means during the initial portion of the opening operation.

5. A circuit interrupter including a pair of spaced conducting members, disconnect switch blade means for bridging said conducting members, means for moving the switch blade means into and out of engagement with one of said members, an arc extinguishing interrupting device stationarily fixed relative to said one of said members and having a pair of arc establishing contacts, a spring cage including an opening spring and a closing spring, one of the arc establishing contacts being movable and connected to one end of each of said opening and closing springs intermediate the ends of the spring cage, means including a movable conducting operating arm for pretensioning the springs by moving the spring cage relative to the movable arc extinguishing contact at the beginning of the opening operation, and the initial opening motion of the disconnect switch blade means causing the engagement thereof with the operating arm to effect the actuation of said last-mentioned means.

6. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, one of the arc establishing contacts being connected to one end of each of said opening and closing springs intermediate the ends of the spring cage, and means for causing the initial opening motion of the blade means to slightly move the spring cage to pretension the springs more than they were tensioned in the closed-circuit position of the interrupter.

7. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, one of the arc establishing contacts being movable and connected to one end of each of said opening and closing springs intermediate the ends of the spring cage, latching means for latching the movable arc establishing contact in either the closed or open positions to thereby tension the springs, and means for causing the initial opening motion of the blade means to slightly move the spring cage to pretension the springs more than they were tensioned in the closed circuit position of the interrupter.

8. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, one of the arc establishing contacts being connected to one end of each of said opening and closing springs intermediate the ends of the spring cage, cam means for pretensioning the spring cage, at least one operating arm for rotating the cam means, and the blade means causing the operating arm to rotate the cam means during the initial portion of the opening operation.

9. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, one of the arc establishing contacts being connected to one end of each of said opening and closing springs intermediate the ends of the spring cage, cam means for pretensioning the spring cage, a pair of resilient spaced operating arms for rotating the cam means, and the blade means causing the operating arms to rotate the cam means during the initial portion of the opening operation.

10. A circuit interrupter including an arc extinguishing device having a movable contact, means biasing the movable contact closed when it is in the open position, retaining means holding the movable contact open against the bias, means biasing the movable contact open when it is in the closed position, retaining means holding the movable contact in the closed position against the bias, operating means for releasing the retaining means including a rotatable shaft extending out of the arc extinguishing device, means including a conducting switch blade for causing rotation of the shaft, and the closing movement of the switch blade causing rotation of the shaft to effect thereby release of the retaining means and biased closing movement of the movable contact.

11. A circuit interrupter including a pair of spaced conducting members, movable disconnect switch blade means for bridging said conducting members to establish an electrical circuit therebetween, means for moving said disconnect switch blade means into and out of engagement with at least one of said conducting members, an arc extinguishing interrupting device stationary relative to said one conducting member and having a vertical arc passage therein, the arc passage being enclosed on the top and on the sides and having a movable contact movable vertically therein, actuating means for the arc extinguishing interrupting device including a shaft extending out of the arc extinguishing interrupting device, an opening biasing means and a closing biasing means for the movable contact, latching means for latching the movable contact in the open and closed positions, means interconnecting rotation of the shaft with release of the latching means, and the disconnect switch blade means effecting rotation of the shaft to operate the arc extinguishing device during the opening operation.

12. A circuit interrupter including a pair of spaced conducting members, movable disconnect switch blade means for bridging said conducting members to establish an electrical circuit therebetween, means for moving said disconnect switch blade means into and out of engagement with at least one of said conducting members, an arc extinguishing interrupting device stationary relative to said one conducting member and having a vertical arc passage therein of gas evolving material, the arc passage being enclosed on the top and on all sides and having a movable contact movable vertically therein, actuating means for the arc extinguishing interrupting device including a shaft extending out of the arc extinguishing interrupting device, an opening biasing means and a closing biasing means for the movable contact, latching means for latching the movable contact in the open and closed positions, means interconnecting rotation of the shaft with release of the latching means, and the disconnect switch blade means effecting rotation of the shaft to operate the arc extinguishing device during the opening operation, the arc passage being open only at the bottom to cause the gases to be expelled out of the bottom of the arc extinguishing device.

13. A circuit interrupter including a pair of spaced conducting members, movable disconnect switch blade means for bridging said conducting members to establish an electrical circuit therebetween, means for moving said disconnect switch blade means into and out of engagement with at least one of said conducting members, an arc extinguishing interrupting device stationary relative to said one conducting member and having a vertical arc passage therein, the arc passage being enclosed on the top and on all sides and having a movable contact movable vertically therein, actuating means for the arc extinguishing interrupting device including a shaft extending out of the arc extinguishing interrupting device, a vertical spring for opening the movable contact, retaining means for the spring releasable to open the movable contact with a snap action, a vertical spring for closing the movable contact, the retaining means being releasable to close the movable contact with a snap action, and the disconnect switch blade means effecting rotation of the shaft to operate the arc extinguishing device during the opening operation by effecting release of the retaining means.

14. A circuit interrupter including a pair of spaced conducting members, movable disconnect switch blade means for bridging said conducting members to establish an electrical circuit therebetween, means for moving said disconnect switch blade means into and out of engagement with at least one of said conducting members, an arc extinguishing interrupting device stationary relative to said one conducting member and having a vertical arc passage therein, the arc passage being enclosed on the top and on all sides and having a movable contact movable vertically therein, actuating means for the arc extinguishing interrupting device including a shaft extending out of the arc extinguishing interrupting device, a vertical spring for closing the movable contact, retaining means for the spring releasable to close the movable contact with a snap action, and the disconnect switch blade means effecting rotation of the shaft to operate the arc extinguishing device during the opening operation.

15. A circuit interrupter including a pair of spaced conducting members, a movable disconnecting switch blade for bridging said conducting members to establish an electrical circuit therebetween, means for moving said disconnecting switch blade into and out of engagement with at least one of said conducting members, an arc-extinguishing interrupting device stationary relative to said one conducting member, a movable contact associated with the interrupting device, means biasing the movable contact closed when it is in the open position, means biasing the movable contact open when it is in the closed position, retaining means holding the movable contact in the closed and open positions, releasing means for releasing the retaining means, and means interconnecting the opening and closing motions of the disconnecting switch blade with operation of the releasing means.

16. A circuit interrupter including a pair of spaced conducting members, movable blade means for bridging said conducting members to establish an electrical circuit therebetween, means for moving said blade means into and out of engagement with at least one of said conducting members, an arc extinguishing interrupting device stationary relative to said one conducting member and having a pair of arc establishing contacts, one of which is connected electrically to the said one of said conducting members, a spring cage including an opening spring and a closing spring, one of the arc establishing contacts being connected to one end of each of said opening and closing springs intermediate the ends of the spring cage, latching means for said one arc establishing contact, releasing means for the latching means, and means interconnecting the opening and closing motions of the movable blade means with operation of the releasing means.

References Cited in the file of this patent

UNITED STATES PATENTS

| Number | Name | Date |
| --- | --- | --- |
| 2,172,225 | Schofield et al. | Sept. 5, 1939 |
| 2,200,122 | Rawlins | May 7, 1940 |
| 2,420,074 | Froland | May 6, 1947 |
| 2,431,147 | Steinmayer | Nov. 18, 1947 |
| 2,601,138 | Hart | June 17, 1952 |